United States Patent
Baltus

(10) Patent No.: US 9,915,455 B2
(45) Date of Patent: Mar. 13, 2018

(54) COOLING CIRCUIT, COLD DRYING INSTALLATION AND METHOD FOR CONTROLLING A COOLING CIRCUIT

(71) Applicant: ATLAS COPCO AIRPOWER, NAAMLOZE VENNOOTSCHAP, Wilrijk (BE)

(72) Inventor: Frits Cornelis A. Baltus, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 298 days.

(21) Appl. No.: 14/418,245

(22) PCT Filed: Jul. 22, 2013

(86) PCT No.: PCT/BE2013/000039
§ 371 (c)(1),
(2) Date: Jan. 29, 2015

(87) PCT Pub. No.: WO2014/019033
PCT Pub. Date: Feb. 6, 2014

(65) Prior Publication Data
US 2015/0168038 A1 Jun. 18, 2015

(30) Foreign Application Priority Data
Aug. 3, 2012 (BE) .................... 2012/0528

(51) Int. Cl.
*F25B 1/00* (2006.01)
*F25B 49/02* (2006.01)
(Continued)

(52) U.S. Cl.
CPC ............ *F25B 49/02* (2013.01); *B01D 53/265* (2013.01); *F25B 1/10* (2013.01); *F25B 5/02* (2013.01);
(Continued)

(58) Field of Classification Search
CPC .......... F25B 43/02; F25B 5/02; F25B 41/062; F25B 2400/06; B01D 53/265
See application file for complete search history.

(56) References Cited

U.S. PATENT DOCUMENTS 6,715,304 B1    4/2004  Wycoff
2004/0206094 A1  10/2004  Maeda
(Continued)

FOREIGN PATENT DOCUMENTS

JP    01127859 A    5/1989
JP    0579721 A    3/1993
(Continued)

OTHER PUBLICATIONS

International Preliminary Report on Patentability for corresponding International PCT Application No. PCT/BE2013/000039, dated Oct. 29, 2014.
(Continued)

*Primary Examiner* — Elizabeth Martin
(74) *Attorney, Agent, or Firm* — Workman Nydegger

(57) ABSTRACT

A cooling circuit is equipped with a coolant, a compressor, a condenser and evaporator expansion valve combinations, whereby the outlets of the evaporators are connected to a collection pipe connected to the compressor. The cooling circuit comprises a control unit connected to a temperature sensor and a pressure sensor affixed in the collection pipe and connected to the expansion valves for the control of them. The control unit is provided with an algorithm for controlling the expansion valves on the basis of the temperature sensor and pressure sensor to control the superheating in the collection pipe.

5 Claims, 2 Drawing Sheets

(51) Int. Cl.
*B01D 53/26* (2006.01)
*F25B 5/02* (2006.01)
*F25B 41/06* (2006.01)
*F25B 1/10* (2006.01)

(52) U.S. Cl.
CPC ........ *F25B 41/062* (2013.01); *F25B 2400/06* (2013.01); *F25B 2600/0253* (2013.01); *F25B 2600/21* (2013.01); *F25B 2700/1933* (2013.01); *F25B 2700/21151* (2013.01)

(56) References Cited

U.S. PATENT DOCUMENTS

2008/0276636 A1   11/2008   Thybo et al.
2009/0133416 A1*   5/2009   Swofford ................. F25B 5/02
                                                     62/126
2009/0320505 A1   12/2009   Van Dijck et al.

FOREIGN PATENT DOCUMENTS

JP         07120091 A    5/1995
WO      2006011789 A1    2/2006
WO      2012029764 A1    3/2012

OTHER PUBLICATIONS

International Search Report for corresponding International PCT Application No. PCT/BE2013/000039, dated Oct. 25, 2013.

* cited by examiner

COOLING CIRCUIT, COLD DRYING INSTALLATION AND METHOD FOR CONTROLLING A COOLING CIRCUIT

BACKGROUND

The present invention relates to a cooling circuit, a cold drying installation, and a method for controlling a cooling circuit.

Water generally has to be removed from compressed gas, such as compressed air, before being supplied to a pneumatic network because the moisture in the gas can be harmful for the components and tools in the pneumatic network, as moisture can lead to corrosion or the accumulation of water in the tools that are not designed for this.

A known technique for drying gas is known as cold drying, and this technique is based on the principle that by cooling the gas, moisture is evacuated from the gas that is saturated or partly saturated with water, because the moisture condenses and is removed as condensed water, after which the gas is heated up again so that it is no longer saturated and thus dryer.

With cold drying a device is used that essentially consists of a closed cooling circuit that comprises a coolant that can be driven around the circuit by one or more parallel compressor(s), and which further comprises, successively in the flow direction of the coolant, a condenser that connects to the output of the compressor; an expansion valve followed by an evaporator that connects to the input of the aforementioned compressor(s), whereby the evaporator forms the primary section of a heat exchanger, and this heat exchanger also comprises a secondary section through which the gas to be dried is guided.

By entire or partial evaporation of the coolant in the evaporator, as is known, heat is extracted from the gas to be dried that flows through the secondary section, whereby this gas to be dried is cooled such that condensate is released that can be separated out, after which the gas is further dried by heating it up again.

In order to prevent damage to the compressor(s), no liquid coolant may get in because liquid coolant can damage the compression chamber and can also take the place of the oil in the compressor thereby causing accelerated wear or the bearing can seize.

For this reason, and with observance of a safety margin, traditionally it is ensured that the coolant at the outlet of the evaporator is slightly superheated with a superheating temperature of approximately 5° C. for example.

Superheating means that the temperature of the coolant in a certain place is higher than the condensation temperature, whereby the vapour pressure of the coolant is equal to the pressure in the cooling circuit in the same place. This pressure is not constant, and thus the said condensation temperature is not either.

The extent of superheating must be limited because the higher the average temperature in the primary section of the heat exchanger, the lower the heat exchanging capacity, as the temperature at the outlet of the evaporator becomes higher.

With a higher temperature of the coolant the energy-efficiency of the compressor(s) is also lower, and there is a risk that the design limits for the temperature at the outlet of the compressor(s) will be exceeded.

In order to control the extent of superheating, traditionally the expansion valve of an evaporator is controlled for a limited extent of superheating at the evaporator outlet. If the extent of superheating becomes greater than a certain target value, the expansion valve is opened such that more coolant gets into the evaporator and the superheating is reduced. If the superheating is less than the aforementioned target value, the expansion valve is controlled in the opposite direction and thus closed in other words.

Especially for cold drying installations with a high capacity, it is desirable to divide up the cooling circuit into a number of parallel sub-circuits and to operate with more than one heat exchanger.

The main reason for this is that heat exchangers can only be built for a reasonable price up to a certain heat-exchanging capacity, and also that large heat exchangers do not generally present optimum operation because a good distribution of coolant over the heat exchanger(s) is difficult to realise.

In this case there can be a number of heat exchangers, each with their own expansion valve, primary section and secondary section, placed in parallel. The various sub-flows of the gas to be dried that flow through the respective secondary sections of the heat exchangers, normally, but not necessarily, come back together again after cooling. In practice the flow rates through the various secondary circuits are approximately equal to one another.

The control of the superheating is hereby problematic, because the control of an expansion valve, in order to control the superheating at the outlet of the evaporator belonging to it, has effects on the coolant flow rates through the other expansion valves, and thus the extent of superheating in the other evaporators belonging to these expansion valves.

As a result an unstable control situation is obtained that leads to a fluctuating level of superheating and fluctuating temperatures at the outlet of the secondary sections of the heat exchangers. These temperatures, that are also called the lowest air temperature or "LAT" of a heat exchanger, can also present mutual variations. A stable uneven situation with individual LAT values that differ from the set point is also possible.

The gas, cooled in the various secondary circuits, thus has a time-varying temperature that is also not the same in the various secondary circuits.

The unstable situation has a negative impact on the temperature to be reached by the gas to be dried in the secondary sections of the heat exchangers, because too high a LAT in one secondary circuit cannot be compensated by a lower LAT in another secondary circuit. This is due to the fact that the desired LAT is typically only a few degrees above the freezing point of water, and thus an individual LAT may not normally be lower than a target value to a avoid the risk of freezing.

With a relatively small number of evaporators, for example four, and with a selection of specific coolants, the control problem is limited in practice, but indeed measurable.

With a wide choice of coolants and more than four evaporators, for example, however this problem prevents the concrete application of cool-drying installations with parallel evaporators.

SUMMARY

The purpose of the present invention is to provide a solution to one or more of the aforementioned and other disadvantages by providing a cooling circuit that is equipped with a coolant, a compressor, a condenser and evaporator-expansion valve combinations in parallel in the cooling circuit whereby the evaporators form a part of separate heat exchangers and whereby the outlets of the respective evaporators are connected to a collection pipe that is connected to an inlet of the aforementioned compressor, whereby this cooling circuit comprises a control unit that is connected to at least one temperature sensor and at least one pressure sensor that are affixed in the aforementioned collection pipe and which also has a control connection to the aforementioned expansion valves, and whereby the control unit is provided with an algorithm for controlling the expansion valves on the basis of measurement signals originating from the aforementioned temperature sensor and pressure sensor, in order to control the superheating in the aforementioned collection pipe, whereby the evaporators form the primary section of separate heat exchangers that each also comprise a secondary section; and that the aforementioned control unit is connected to measurement means for determining the lowest gas temperature of the secondary sections of each of the aforementioned heat exchangers and that this control unit comprises an algorithm for controlling the lowest gas temperature of the separate heat exchangers according to the same target value, by the separate control of the respective expansion valves of each respective heat exchanger.

This differs from a conventional cooling circuit in which the superheating is controlled for each evaporator. With a cooling circuit according to the invention, no account is taken of the individual superheating after the evaporators.

This has the advantage that a stable operation of the cooling circuit is hereby obtained, without "runaway" of the control, such that both the quality of the dried gas in terms of moisture content and its constancy, and the lifetime of the cooling circuit, are improved.

Another advantage is that thanks to the invention, a cooling circuit can be equipped with a large number of evaporators placed in parallel, such that larger installations can be built than was previously the case, and also that installations with a capacity corresponding to the largest present installations can be built more cost-efficiently.

Due to a direct control of the temperature at the inlet of the compressor, the compressors are very well protected against exceeding the design temperature and against contamination of the oil that would result in a loss of lubricating properties.

An advantage is also that fewer sensors are needed for pressure and temperature in a cooling circuit according to the invention. This reduces the cost and complexity.

The control mechanism for controlling the LAT of the separate heat exchangers according to the same target value, that is preferably equal to the average of the LAT values of the individual heat exchangers, has the advantages that the temperatures of the gas flows from the secondary sections are equal, such that the average of the LAT values of the heat exchangers can be equal or very close to its target temperature, such that a low moisture content of the gas to be dried can be obtained.

The invention also relates to a cold drying installation for gas that comprises a cooling circuit described above, the heat exchangers whose evaporators are incorporated in the cooling circuit, an inlet pipe for the gas connected to a heat exchanger, and an outlet pipe connected to a heat exchanger for the gas.

The invention also relates to a method for controlling a cooling circuit that comprises a coolant, a compressor, a condenser and evaporator-expansion valve combinations incorporated in parallel in the cooling circuit, from which the outgoing coolant flows are mixed together into a combined coolant flow that is drawn in by the compressor, and in which each evaporator forms a section of a separate heat exchanger, whereby the superheating of the combined coolant flow is controlled according to a target value by determining it and then jointly controlling the expansion valves, whereby the evaporators form the primary section of separate heat exchangers that each also comprise a secondary section through which a gas to be dried is guided; that the lowest gas temperature of each separate heat exchanger is controlled according to the same target value by controlling each expansion valve separately on the basis of a difference between a measured lowest gas temperature of the heat exchanger belonging to the expansion valve and the aforementioned target value.

BRIEF DESCRIPTION OF THE DRAWINGS

With the intention of better showing the characteristics of the invention, a preferred embodiment of a cooling circuit according to the invention and a method according to the invention for controlling a cooling circuit is described hereinafter by way of an example, without any limiting nature, with reference to the accompanying drawings, wherein.

DETAILED DESCRIPTION OF VARIOUS EMBODIMENTS

Figure 1:
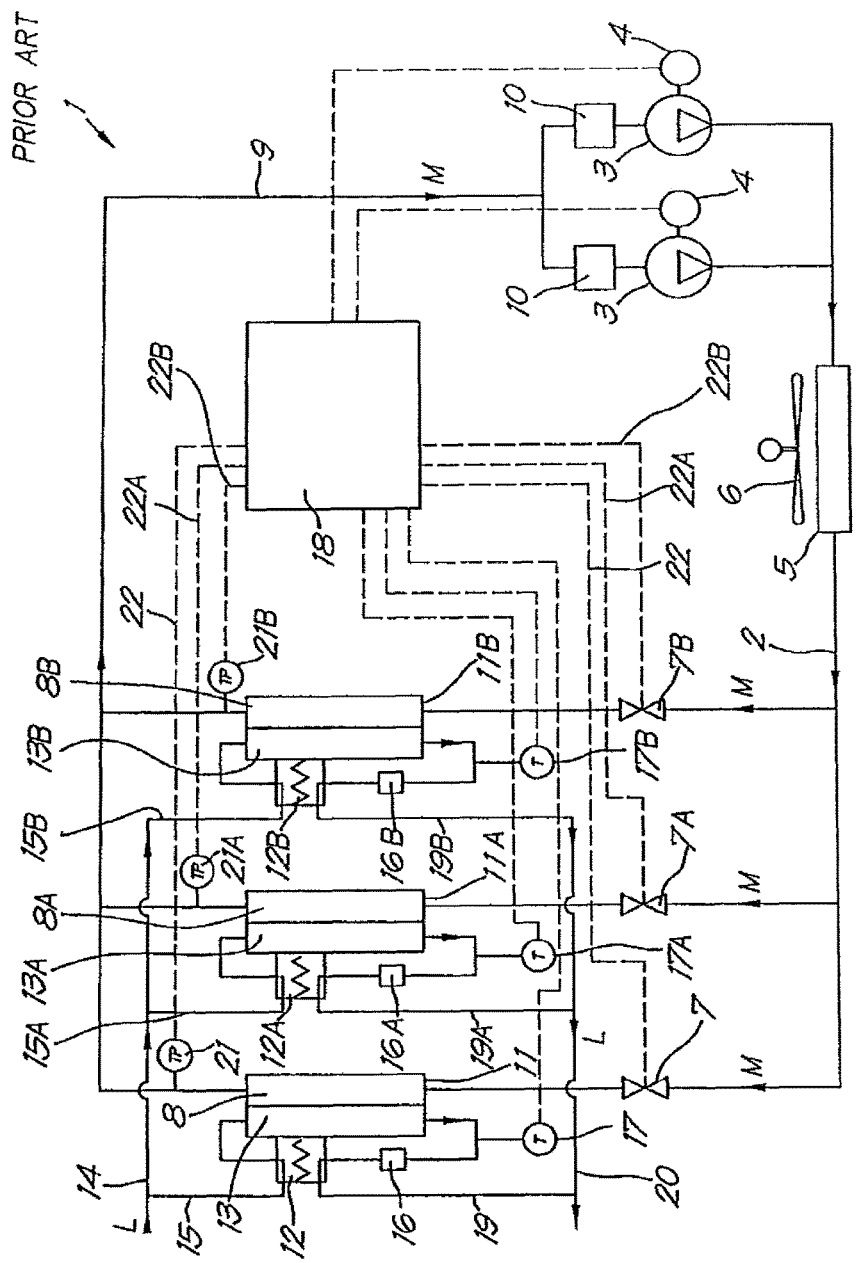
FIG. 1 schematically shows a cooling circuit according to the state of the art in an application of cold drying.

FIG. 1 shows a conventional cold drying installation 1 for cold drying gases that comprises a cooling circuit with a coolant in it, which can be driven around the circuit by one or more compressors connected in parallel by a drive by means of a motor 4 or similar.

The flow direction of the coolant in the cooling circuit 2 is indicated in the drawing by the arrows M.

Furthermore the cooling circuit successively comprises, in the flow direction of the coolant, a condenser 5 that connects to the outlet of the compressor(s) 3 and which is cooled, for example by means of a fan 6 or by means of water; controllable expansion valves 7, 7A, 7B, each with an evaporator 8, 8A, 8B connected to each of them. The evaporators 8, 8A, 8B are placed in parallel in the cooling circuit and their respective outputs are connected, via a joint collection pipe 9 and a liquid separator 10 for each compressor 3, to the input of the aforementioned compressor(s).

The sides of the respective expansion valves 7, 7A, 7B, that are not connected to a respective evaporator 8, 8A, 8B, are connected together and connect to the outlet side of the condenser 5, or in other words to the side of the condenser through which, during the operation of the cooling circuit 2, the liquid coolant leaves the condenser 5.

The heat exchangers 11, 11A, 11B consist of an evaporator/gas section (8/13, 8A/13A, 8B/13B) and a gas-gas section 12, 12A, 12B. In the evaporator/gas 8, 8A, 8B form the primary section of heat exchangers through which the coolant flows, and 13, 13A, 13B form the secondary section through which the gas to be dried flows. The gas to be dried is supplied via a joint inlet pipe 14 and individual inlet pipes 15, 15A, 15B in the direction of the arrows L.

In these heat exchangers 11, 11A, 11B the gas first flows through the gas/gas section 12, 12A, 12B and then through the secondary section 13, 13A, 13B, where it comes into thermal contact with the evaporator 8, 8A, 8B to be thereby cooled.

Due to the cooling, condensation of the water in the gas takes place. The condensate hereby formed can be separated in a condensate separator 16, 16A, 16B. The temperature of the air flow in this condensate separator 16, 16A, 16B is measured by a temperature measurement point 17, 17A, 17B that is connected to a control unit 18.

The cooled gas stripped of water is then heated up again in the gas/gas section 12, 12A, 12B of the heat exchangers 11, 11A, 11B and driven via individual outlet pipes 19, 19A, 19B to a joint outlet pipe 20.

The aforementioned gas/gas section 12, 12A, 12B of the heat exchangers hereby forms a recovery heat exchanger in which warm gas to be dried is precooled by gas already cooled in the secondary section 13, 13A, 13B that has been stripped of free condensate and that is thus heated up again.

In this known cold drying installation 1, at the outlet of each evaporator 8, 8A and 8B there is a pressure and temperature measurement point 21, 21A, 21B that is connected to the control unit 18. It is also possible that the pressure and temperature measurement is directly coupled to one mechanical expansion valve.

The information from these measurement points 21, 21A, 21B is used by the control unit 18 or by the individual valve itself to adjust the position of the respective expansion valves 7, 7A, 7B such that the temperature of the coolant at the outlet of each evaporator 8, 8A, 8B is such that the coolant is superheated, so that there is certainly no further liquid phase.

It is hereby the case that to control a certain expansion valve, for example 7A, only the information from the measurement point 21A belonging to the evaporator 8A concerned is used, and that there are thus three separate control circuits 22, 22A, 22B.

Superheating means that the coolant has a higher temperature than the temperature at which the vapour pressure of the coolant is equal to the pressure, thus the condensation temperature of the coolant.

The level of superheating can be expressed as a superheating temperature that is equal to the actual temperature of the coolant less the condensation temperature of the coolant. This superheating temperature has a certain target value, for example 5° C., that is chosen such that incomplete evaporation of liquid coolant is avoided, and also that an unnecessarily high superheating temperature with a possible negative impact on the lifetime of the components of the compressor(s) 3 and their energy efficiency is avoided.

The condensation temperature is indirectly measured by a pressure measurement. The condensation temperature at a known pressure can then be calculated or read off from a table, such that from a measurement of pressure and temperature the superheating temperature can be calculated and the position of the expansion valves 7, 7A, 7B controlled on the basis of the difference between the calculated value and the target value of the superheating temperature.

The dew point in the joint outlet pipe 20 of the gas to be dried corresponds to the average LAT, as measured by the temperature measurement points 17, 17A, 17B. This LAT is compared to a target value on the basis of which the speed of the drive motor(s) 4 of the compressor(s) is adjusted if necessary. In this way the capacity of the cooling circuit 2 can be adapted to the required cooling capacity.

Figure 2:
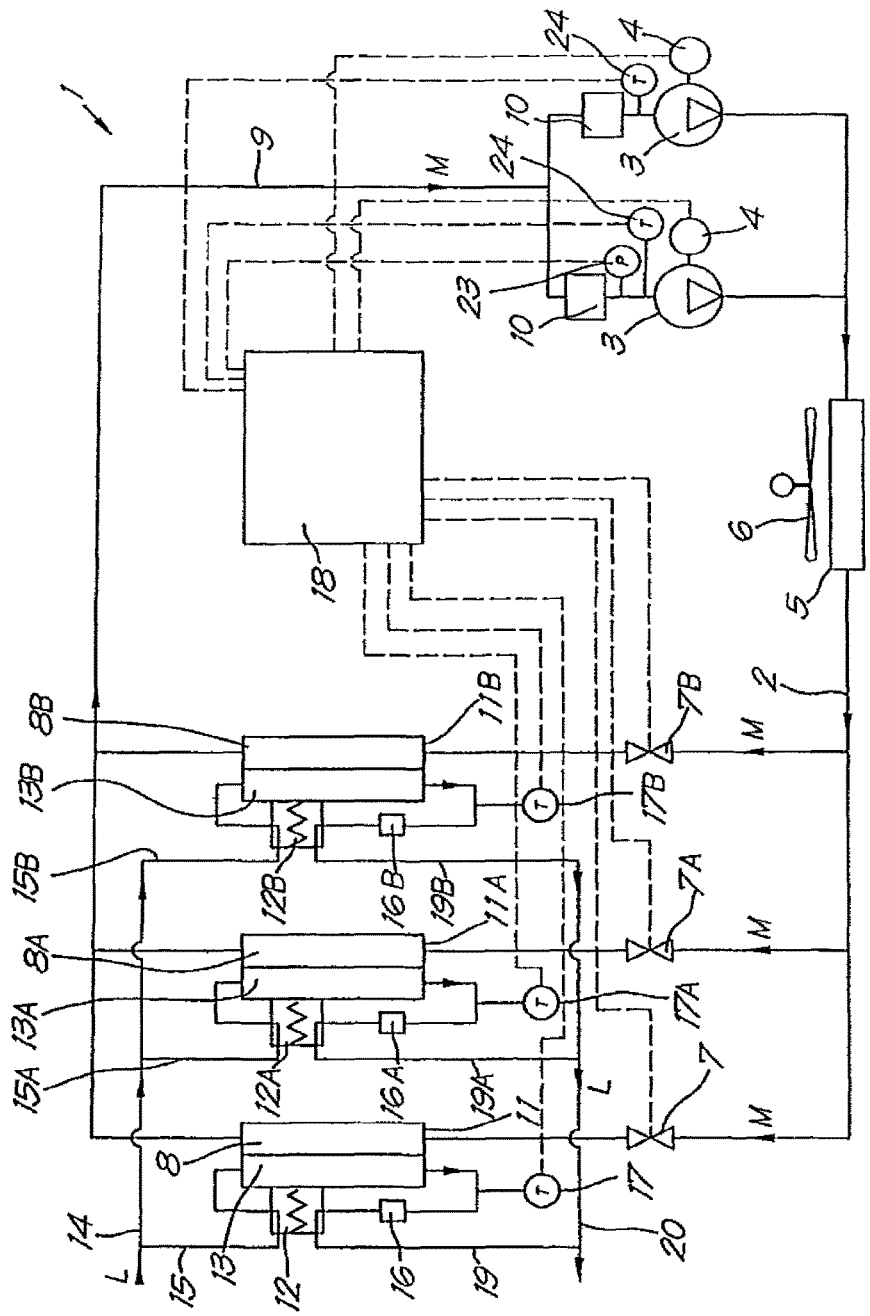
FIG. 2 shows a cooling circuit according to the invention in the same application.

A cold drying installation 1 that is equipped with a cooling circuit 2 according to the invention is shown in FIG. 2. The realisation at the basis of this invention is not that the avoidance of the presence of liquid coolant in the individual evaporator 8, 8A, 8B is critical, but the avoidance of the presence of liquid coolant at the inlet of the compressor(s) 3, and this with the focus on an equal LAT in each of the heat exchangers 11, 11A, 11B. This means that the coolant in an individual evaporator 8, 8A, 8B may be entirely or partially liquid for as long as the mixture is not totally superheated.

The cold drying installation 1 with cooling circuit 2 according to the invention, in contrast to the known cold drying installation 1, is not necessarily equipped with a pressure and temperature measurement point 21, 21A, 21B at the outlet of each evaporator 8, 8A, 8B. There is indeed a pressure measurement point 23 and a temperature measurement point 24 at the inlet of a compressor 3, whereby this pressure measurement point 23 and temperature measurement point 24 can be housed in a combined pressure and temperature measurement unit, and a temperature measurement point 24 is provided at the inlet of the other compressor 3.

The collection pipe must be long enough to ensure good mixing of the coolant that comes out of the different evaporators 8, 8A, 8B and/or can be provided with means to improve the mixing, such as a static or otherwise mixer. If the mixing is very intensive, the collection pipe 9 can also be very short, and in extremis can even be limited to just a collection point where the coolant flows coming out of the evaporators 8, 8A, 8B come together.

The operation of a cold drying installation 1 with cooling circuit 2 according to the invention is the same as the traditional installation with regard to circulation, compression, expansion, cooling and heating of the coolant. The way in which the operation of the cooling circuit 2 is controlled is different and as described below.

As input data the control unit 18 receives the LAT of each of the separate heat exchangers 11, 11A, 11B and the pressure and temperature values in the collection pipe 9 at the inlet of the compressors 3, from which the superheating temperature is calculated.

These input data are processed as follows: the position of all individual expansion valves 7, 7A, 7B, is changed jointly and in the same direction, and preferably to the same extent, when a difference between the superheating temperature and a target value for it is found, and such that a higher than desired superheating temperature leads to the further opening of all expansion valves 7, 7A, 7B, and a lower than desired superheating temperature leads to the further closing of all expansion valves 7, 7A, 7B.

In this way the average opening of the expansion valves 7, 7A, 7B is adjusted to control the superheating temperature according to its target value, and this independently of the control of the individual expansion valves 7, 7A, 7B on the basis of other input data.

The average LAT is also calculated. On the basis of this calculated average LAT and the individual LAT values of the respective heat exchangers 11, 11A, 11B the position of the expansion valve 7, 7A, 7B belonging to each heat exchanger 11, 11A, 11B is adjusted, and such that if the individual LAT is higher than the calculated average LAT, the expansion valve 7, 7A, 7B concerned opens to a lesser extent and vice versa. In this way the separate expansion valves 7, 7A, 7B are continuously controlled with the aim that the individual LAT values are controlled according to the average LAT value.

In this way separate control circuits are no longer used, as traditionally, but the control circuits of the expansion valves 7, 7A, 7B are connected together.

The speed of the motor(s) 4 can be adjusted on the basis of the average LAT, just as with a traditional installation 1.

To this end, it is necessary for the controller of the motor speed to communicate with the control unit 18, or for them to be brought together in a combined control unit.

The optimum control frequency for both the average position of the expansion valves 7, 7A, 7B for the superheating on the one hand, and the individual position for the LAT on the other, can also be determined by a person skilled in the art from the response characteristics of an individual cold drying installation 1.

It has turned out that for the control of the separate positions of expansion valves 7, 7A, 7B in cold drying installations 1 with a larger number, for example eight, of expansion valves 7, 7A, 7B and evaporators 8, 8A, 8B, the following function gives good results.

$$V_n = A \cdot ABS(x_n) x_n^3 + B \cdot x_n^3 + C \cdot ABS(x_n) x_n + D \cdot x_n$$

Where $V_n$ is the extent to which the opening or closing of the expansion valve 7, 7A, 7B with a number n has to be changed, as a result of a difference $x_n$ between the individual LAT in the respective secondary section 13, 13A, 13B with number n on the one hand, and the average LAT on the other defined as $LAT_n - LAT_{average}$. The term $ABS(x_n)$ stands for the absolute value of $x_n$.

The invention is not limited to this specific function, but other functions are also possible.

For the control of the average positions of the expansion valves 7, 7A, 7B, the following function gives good results.

$$W = E \cdot ABS(y) y^3 + F \cdot y^3 + G \cdot ABS(y) y + H \cdot y$$

Where W is the extent to which the opening or closing of all expansion valves 7, 7A, 7B has to be changed as a result of the difference y between the superheating temperature and its target value.

The invention is not limited to this specific function, but other functions are also possible.

The parameters A, B, C, D, E, F, G, H are adjustable to obtain a good control characteristic, and depend on the control frequency among others.

It is also possible to select other parameters, depending on the sign of the variables $x_n$ or y. This can be useful for example for the control of the superheating temperature, because too little superheating is potentially a very damaging situation that must be acted against more strictly than too much superheating, that is rather to be considered as undesirable.

A total control in which the sum of the adjustments $V_n$ and W for each expansion valve 7, 7A, 7B is calculated and passed on at a certain frequency is also possible, instead of two separate adjustments $V_n$ and W.

The use of the cooling circuit 2 according to the invention is not limited to the cold drying of gases, but it can also be utilised for other applications.

The cooling circuit 2 shown in FIG. 2 has three parallel evaporators 8, 8A, 8B, each with its own expansion valve 7, 7A, 7B. It is clear that this is only given as an example, and that the number of evaporator-expansion valve combinations 7-8 can be expanded according to desire. The invention even provides a relatively greater advantage with a larger number of parallel evaporators 8, 8A, 8B.

The cooling circuit 2 shown in FIG. 2 has two parallel compressors 3. Such a cooling circuit 2 can also be constructed with different numbers of compressors 3, such as one, three or more.

In the drawings each heat exchanger 11, 11A, 11B is equipped with a primary section and a secondary section, but a cooling circuit according to the invention can also be used for other purposes than cold drying, in which case the presence of a secondary section of the heat exchangers 11, 11A, 11B is not always necessary. The invention is thus not limited in this way.

The present invention is by no means limited to the embodiments described as an example and shown in the drawings, but a cooling circuit according to the invention and a method for controlling a cooling circuit can be realised in all kinds of variants, without departing from the scope of the invention.

The invention claimed is:

1. A cooling circuit including a coolant, a compressor, a condenser and evaporator expansion valve combinations in parallel in the cooling circuit wherein the evaporators form a part of separate heat exchangers and wherein the outlets of the respective evaporators are connected to a collection pipe connected to an inlet of the compressor, wherein the cooling circuit comprises a control unit connected to at least one temperature sensor and at least one pressure sensor affixed in the collection pipe and connected to the expansion valves for the control of them; wherein the control unit is provided with an algorithm for controlling the expansion valves on the basis of measurement signals originating from the temperature sensor and pressure sensor to control the superheating in the collection pipe, wherein the evaporators form the primary section of separate heat exchangers such that each comprise a secondary section; and the control unit is connected to measurement means for determining the lowest gas temperature of the secondary sections of each of the heat exchangers and the control unit comprises an algorithm for controlling the lowest gas temperatures of the separate heat exchangers according to the same target value, by the separate control of the respective expansion valves of each respective heat exchanger.

2. The cooling circuit according to claim 1, wherein the temperature sensor and the pressure sensor are affixed between the inlet of the compressor and a liquid separator that is affixed in the collection pipe.

3. The cooling circuit according to claim 1, wherein the target value is the average of the determined lowest gas temperatures (LAT) of the individual heat exchangers.

4. The cooling circuit according to claim 1, wherein the expansion valves are electronically controlled valves.

5. The cooling circuit according to claim 1, wherein it is equipped with two or more parallel compressors and that each compressor is provided with an individual temperature measurement that is in a branch of the collection pipe leading to the compressor concerned.

* * * * *